United States Patent [19]
Doran

[11] 3,939,329
[45] Feb. 17, 1976

[54] INTERFACE MEANS
[75] Inventor: J. Robert Doran, Warren, Pa.
[73] Assignee: GTE Sylvania Incorporated, Stamford, Conn.
[22] Filed: Aug. 26, 1974
[21] Appl. No.: 500,442

[52] U.S. Cl.............................. 235/151.1; 425/149
[51] Int. Cl.².... G06F 15/46; G06F 3/00; B29F 1/00
[58] Field of Search............. 235/151.1, 151.3, 151; 425/149, 144; 340/172.5; 264/328, 40

[56] References Cited
UNITED STATES PATENTS

| | | | |
|---|---|---|---|
| 3,400,374 | 9/1968 | Schumann .................... | 235/151.1 X |
| 3,721,512 | 3/1973 | Ma et al............................ | 425/149 |
| 3,760,169 | 9/1973 | Paculat ............................ | 235/151.1 |
| 3,767,339 | 10/1973 | Hunkar.............................. | 425/149 |
| 3,826,903 | 7/1974 | Varrasso........................... | 235/151.1 |
| 3,840,312 | 10/1974 | Paulson et al. ............... | 235/151.1 X |
| 3,860,801 | 1/1975 | Hunkar............................ | 235/151.1 |

OTHER PUBLICATIONS
Here's the First Computer–Controlled Injection Machine; Currie, Robert; Modern Plastics; Oct. 1968, pp. 122–126.

Primary Examiner—Edward J. Wise
Attorney, Agent, or Firm—Norman J. O'Malley; Lawrence R. Fraley; Donald R. Castle

[57] ABSTRACT

An interface means for interconnecting a sequentially actuated apparatus and a computer to automatically maintain at a desired level a process variable of said apparatus. The interface means comprises first, second, and third actuation means adapted for actuating the apparatus or computer in accordance with one of the three output signals from the computer to achieve said desired level. A system is also described which automatically maintains a process variable of a sequentially actuated apparatus at a desired level.

16 Claims, 2 Drawing Figures

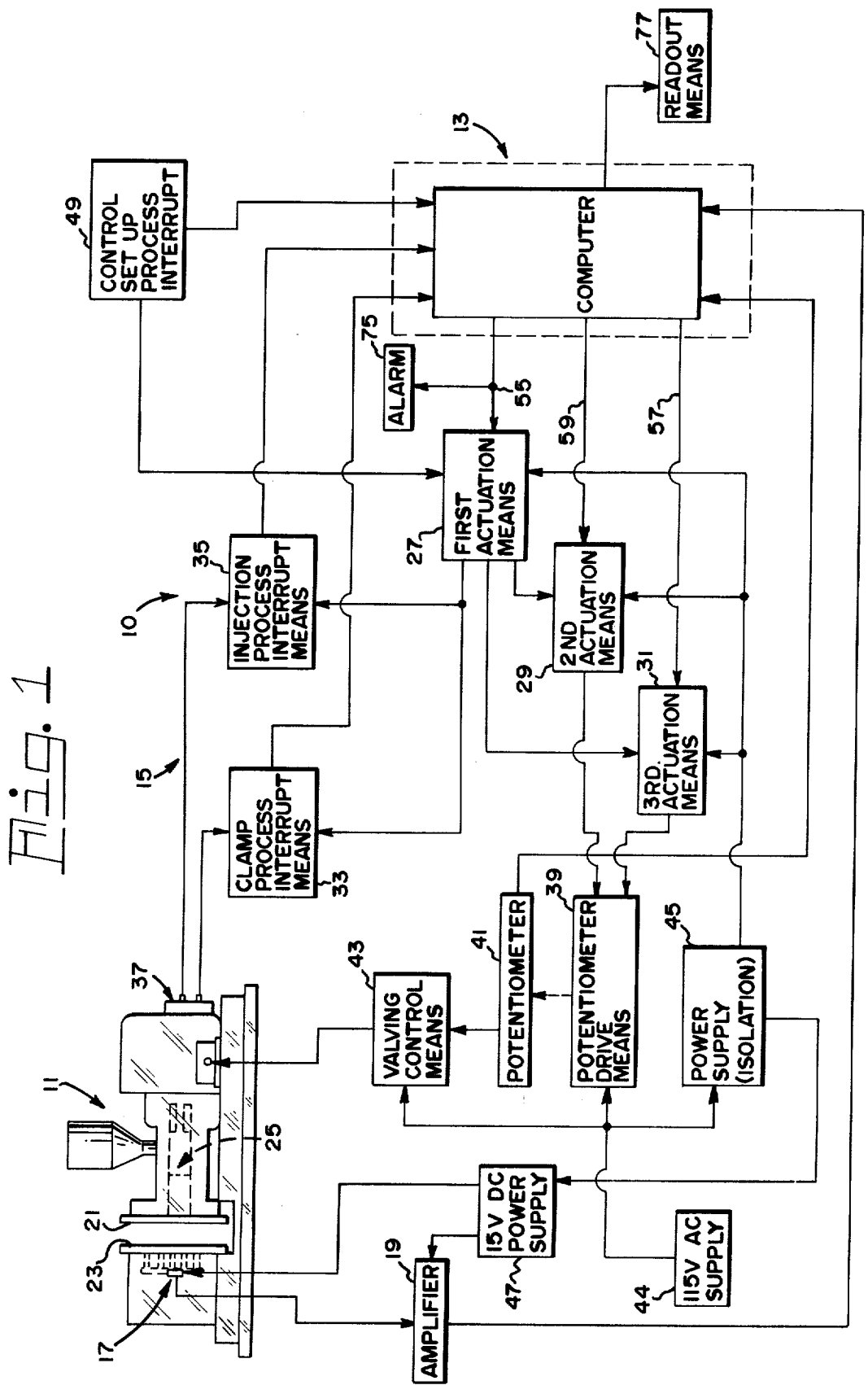

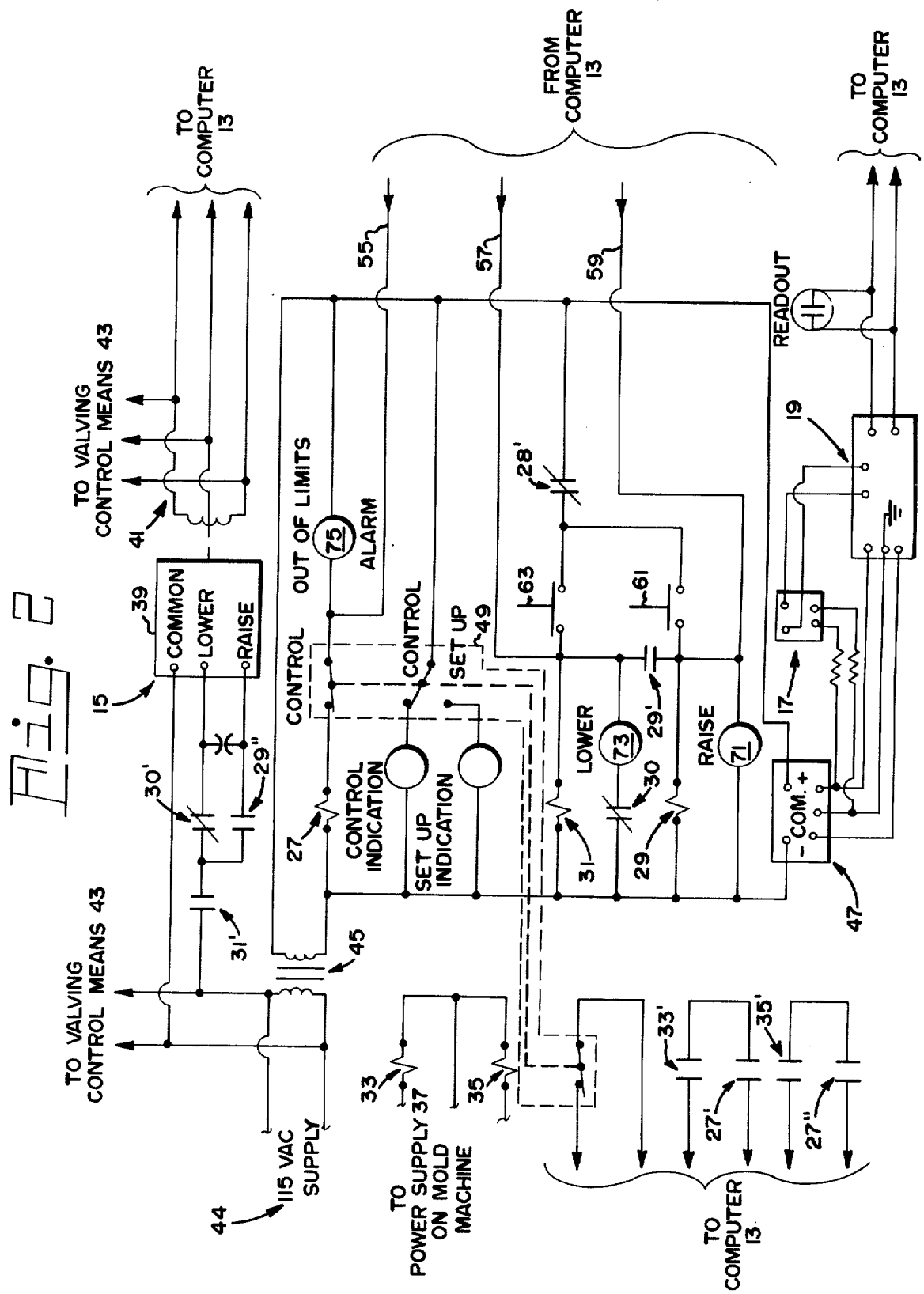

INTERFACE MEANS

BACKGROUND OF THE INVENTION

This invention relates to means for automatically controlling sequentially actuated apparatus.

More particularly, this invention relates to interface means for interconnecting a sequentially actuated apparatus to a computer to automatically maintain at a desired level a process variable of said apparatus.

Even more particularly, this invention relates to interface means capable of interconnecting a plastics injection molding machine and a computer to automatically maintain at a specified level one of the machine's process variables such as boost pressure.

Many varieties of sequentially operated machines such as plastics injection molding machines contain a plurality of process variables which are critical to the production of a satisfactory product. With particular regard to injection molding apparatus, such variables as melt temperature, boost and clamp pressures, heat dissipation in the plasticizing mechanism, and linear movement of the ram all play an essential role in the ultimate formation of the plastic parts. Heretofore, maintaining each of these variables within the required ranges during each repetitive cycle of operation of the machine has been primarily achieved through manual control at the machine proper. Thus, an operator was required to maintain constant vigilance of each machine during its entire operation. Needless to say, such a requirement adds appreciable to both manufacturing costs and the possibilities for human error.

Methods known for automatically controlling injection molding machines to the extent that one or a few of these variables could be reasonably held within desired limits have most usually required extensive electronic circuitry of such complex nature that any cost advantage as opposed to manual control was not appreciated. Additionally, continuous maintenance of this circuitry was essential and added still further to such costs.

Consequently, there has been an increasing demand in industry for the use of relatively small computer systems to serve as control means for processes such as injection molding. Computers of this type provide a degree of reliability heretofore unknown when controlling processes of several machines at one time. Furthermore, because a single computer can be effectively utilized to control several machines, the requirement of only a single operator returns the cost advantage to the manufacturer in addition to substantially reducing the opportunities for human error. Yet, to this date there are no known methods which are relatively inexpensive and simple in operation and which can satisfactorily interconnect a small computer to a production apparatus of the type described to automatically control a process variable of the apparatus. Similarly to the electrical circuitry previously described, interface assemblies have heretofore been substantially complex and costly.

It is believed therefore that an interface means for interconnecting a computer to a sequentially operated machine which is relatively simple in operation and inexpensive to produce and is capable of positively maintaining at a desired level process variables of said machine would constitute an advancement in the art.

OBJECTS AND SUMMARY OF THE INVENTION

It is therefore a primary object of this invention to provide an interface means for interconnecting a computer and a sequentially actuated apparatus.

It is a further object of this invention to provide an interface means for interconnecting a computer and a plastics injection molding machine.

It is an even further object of this invention to provide an interface means of the nature described which is relatively simple in operation and inexpensive to manufacture.

In accordance with one aspect of the invention, there is provided an interface means for interconnecting a sequentially actuated apparatus and a computer to automatically maintain at a desired level a process variable of the apparatus. The interface means comprises first, second, and third actuation means each adapted for receiving one of three output signals from the computer. The first actuation means, upon receiving an output signal, is adapted for actuating the computer to receive a response signal from the apparatus. The second actuation means, upon receiving an output signal, is adapted for actuating the apparatus to increase the level of the process variable to the desired level. The third actuation means, upon receiving an output signal, is adapted for actuating the apparatus to decrease the level of the process variable to the desired level.

BRIEF DESCRIPTION OF THE DRAWINGS

FIG. 1 is a diagrammatic illustration in block form of one embodiment of the present invention.

FIG. 2 is a schematic illustration of a circuit in accordance with one embodiment of the present invention.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

With particular reference to FIG. 1, there is illustrated a system 10 for automatically maintaining at a desired level a process variable of a sequentially actuated apparatus, illustrated as injection molding machine 11. System 10 comprises a computer means 13 and an interface means 15. Computer means 13 is adapted for receiving a response signal from apparatus 11 and for comparing this signal to a reference signal representative of the desired level for one of the process variables of apparatus 11. An example of such a variable, particularly with regard to injection molding machines, is boost pressure. It is to be understood, however, that system 10 is adaptable for maintaining other process variables such as melt temperature, clamp pressure, etc. Upon comparing the response signal from apparatus 11, computer 13 compares this signal with the mentioned reference signal and provides a first output signal of continuous nature and, if applicable, at least one of two secondary output signals. The first of said secondary output signals is indicative that the level of the boost pressure variable is less than desired while the second output signal is indicative that the level of the boost pressure is greater than desired. Computer 13 receives the mentioned response signal from a sensing means 17 positioned within the cavity of the mold apparatus 11. The signal from sensing means 17 is amplified by amplifier 19 to assure a highly responsive signal to the computer.

The operating sequence of injection molding machine 11 is typical of most machines of this variety known in the prior art. With the material to be plasticated positioned within a barrel or similar cylinder of the machine, a moveable clamping face member 21 moves to mate with mold face member 23. At this time the clamp pressure exerted by machine 11 remains continuous to achieve the desired pressure. Once the pre-established level for the clamp pressure is reached, a ram, indicated as member 25 is actuated until a maximum boost pressure is attained filling the mold with the plasticated material. Shortly after reaching the maximum boost pressure, a relatively short hold time occurs to assure that all desired configurations for the parts are attained. After this, ram 25 returns to its original position. Shortly thereafter, a relatively short period is allowed for curing to permit the parts as formed to stablize in shape. The facing members 21 and 23 then open, with the formed parts then ejected.

As mentioned, sensing means 17 detects the maximum boost pressure as exerted by ram 25 during the above-mentioned sequence and accordingly provides a response signal. This response signal is transmitted through amplifier 19 to computer 13. After receiving this response signal and making the aforementioned comparison to an established reference signal or set point indicative of the desired level for the boost pressure, computer 13 is adapted for providing a series of output signals to interface means 15 which in turn reacts accordingly to either adjust or maintain the desired level within apparatus 11. Computer 13 provides a continuous signal to a first actuation means 27. First actuation means 27 is adapted for receiving said continuous output signal and thereafter actuating computer 13 to process the afore-mentioned response signal from sensing means 17.

As stated, computer 13 is adapted for providing a series of output signals. The described first continuous output signal is transmitted to first actuation means 27. Computer 13 is further adapted for providing a pair of secondary output signals to a second actuation means 29 and a third actuation means 31 respectively. Each of the latter described actuation means are operatively connected to the computer and the apparatus and are adapted for actuating the apparatus to either increase or decrease the level of the boost pressure within apparatus 11. As illustrated, first actuation means 27 is operatively connected to apparatus 11 through a pair of process interrupt means 33 and 35 respectively. Process interrupt means 33 is operatively connected to a power supply 37 as typically found on molding machines of the known art. Similarly, process interrupt means 35 is also electrically connected to the aforementioned power supply 37. In operation, process interrupt 33 provides computer 13 with a response signal indicative of the total time required for the afore-mentioned clamping process. Additionally, process interrupt means 35 provides computer 13 with a response signal indicative of the period of time required for injection of the plasticated material into the mold. This latter signal is of particular importance in that it triggers the computer to now read the afore-mentioned response signal from sensing means 17 and make the described comparison. Thus, interrupt means 33 adds only an auxillary function to the aforementioned process in that only injection process interrupt means 35 is required to operate in conjunction with first actuation means 27 to achieve actuation of the computer. Each of the process interrupt means 33 and 35 is triggered by the motions of the various components of apparatus 11, e.g. members 21 and 23, and ram 25. Clamp interrupt means 33 is actuated when the facing member 21 and 23 engage and clamp pressure is exerted. Actuation of both means 33 and 35 can easily be accomplished by relay units automatically triggered within apparatus 11 or similar responsive members which will become engaged and thus triggered upon the movement of the various described components of apparatus 11.

If the comparison by the computer of the response signal from sensing means 17 to the established set point or reference signal within the computer indicates that the boost pressure level is too low, the first of the described secondary output signals is provided second actuation means 29. Second actuation means 29 in turn is adapted for actuating a potentiometer drive means 39. Potentiometer drive means 39 in turn actuates a potentiometer 41 to in turn drive a valving control means 43. Valving control means 43 is operatively connected to the injection molding machine to manipulate a valve within the machine to thus increase the boost pressure applied before the next sequence of operation. It is to be understood that the above described manipulation of the potentiometer drive means 39, potentiometer 41, and valving control means 43 to actuate an electro mechanical valve on the apparatus 11 is illustrative of only an example of the operational capabilities of interface 15. Each of the actuation means 29 and 31 could serve to directly operate an electromechanical means on an apparatus as illustrated.

As further illustrated in FIG. 1, potentiometer drive means 39 receives its power from a 115 volt AC supply 44, such as provided at most common line outputs. An isolation power supply 45 is further provided to provide interface 15 relative isolation from transient voltages as experienced in many production facilities and thus in turn assure a cleaner signal to the interface and computer. A 15 volt DC power supply 47 is utilized to provide power for sensing means 17 and amplifier 19. It is to be understood however that in the preferred embodiment of the invention power supply 47 is required primarily because of the operating characteristics of the components utilized.

As further illustrated in FIG. 1, a control setup process interrupt means 49 is provided and is operatively connected to first actuation means 27 and computer 13. Means 49, as will be further described, provides a means whereby the operator of system 10 may readjust the pressure levels desired through manual operation. Means 49 further provides a means whereby the aforementioned set point can be manually provided computer 13. A description of this operation will be further given with the description of FIG. 2.

In the preferred embodiment of the present invention as illustrated, sensing means 17 is a model No. 406 mold pressure sensor, available from Control Process Incorporated, Plantsville, Conn. Valving control means 43 is preferrably an adjustable electronic power supply, model No. PSVM-10, available from Parker-Hannifin, Elyria, Ohio. It is further preferred to utilize a model No. 78EBC102 potentiometer having a variable resistance of 1,000 ohms, as available from the New England Instrument Company, Chelmsford, Mass., for potentiometer 41. To drive potentiometer 41, a bydirectional motor, model No. 33608 and available from Hydon Smith and Instrument Company, Waterberry, Conn., is preferred for drive means 39. Amplifier 19, power supply 45, and power supply 47 are items well known in the art and available from most electronic sources. Therefore, further descriptions of these components is not considered necessary. Computer 13 is available from International Business Machines, Owego, N.Y. and is more familiarly known as a Systems 7 small computer. The component preferably used for interrupt means 33 and 35, and the actuation means 27, 29 and 31 are relay units purchasable from the Struthers-Dunn Corporation, Pitman, N.J. under the model No. 281XDX. Furthermore, process interrupt means 49 is preferably a three pole manually operated switching means. The injection molding machine as illustrated in FIG. 1 and readily adapted for use with system 10 is available from the Van Dorn Corporation, Cleveland, Ohio and having a shot size range from 12 to 14 ounces. It is to be understood that the above described components represent only preferred members for use with the present invention. It is to be further understood that several other components which can readily provide the desired operational capabilities could easily be substituted for those described.

With particular reference to FIG. 2, a more detailed illustration of the preferred circuitry arrangement for the interface means 15 is illustrated. As described, control setup process interrupt 49 is illustrated as comprising a three pole manually operated switch. First actuation means 27 is illustrated as an electrical relay having a pair of normally-open contact members 27' and 27'' and a normally-closed contact 28'. Similarly, second actuation means 29 is illustrated as comprising an electrical relay having a series of normally-open contact members 29' and 29'' and a pair of normally-closed contacts 30 and 30'. Third actuation means 31 is also illustrated as comprising an electrical relay having a singular normally-open contact member 31'. Also illustrated in FIG. 2 is sensing means 17, amplifier 19, power supply 45, potentiometer drive means 39, potentiometer 41, and power supply 47. As previously mentioned, process interrupt means 33 and 35 are illustrated as comprising a pair of electrical relay members. In turn, relay 33 has a single normally-open contact member 33' while relay 35 has a single normally-open contact member 35'.

As illustrated in FIG. 1, process interrupt means 33 is electrically contacted through contact 33' in series relationship to normally-open contact 27' of first actuation means 27. Similarly, process interrupt means 35 is also electrically connected to first actuation means 27 (through contact member 35' to normally-open contact 27'') to provide the required inputs to computer 13. Both of the described interrupt means 33 and 35 are electrically connected in parallel relationship to the mentioned power source 37 on apparatus 11. Potentiometer drive means 39 comprises a series of 3 station contacts joined electrically to contact members 29'', 30' and 31' of the second and third actuation means. The common terminal for drive means 39 is electrically connected to the described external power supply 44. Potentiometer 41 in turn is electrically joined to the valving control means 43 as is the external power supply previously mentioned.

Computer 13 is operatively connected to interface 15 through interconnecting leads 55, 57 and 59. For purposes of clarification, leads 55, 57 and 59 are also illustrated in FIG. 1.

In operation, the operator presses the manual switching means 49 to the setup mode, thus relieving computer 13 from having control over the operation of apparatus 11. The operator next manipulates the manual control gauge on the mold machine to take a reading of the boost pressure as obtained during a trial run (with no plasticated material therein). The aforementioned manual control gauge and a boost pressure gauge to indicate the pressure output during the movement of the ram are standard components on most injection molding machines. If the reading from this gauge indicates that the boost pressure is below the desired level, the operator is able to adjust for this by depressing manual switch 61. Conversely, if the pressure is above the desired level, the operator depresses switch 63. Both of the described switching members are of the spring-loaded variety and return to their normally-opened position when not depressed.

With interface means 15 in the setup mode, depressing switch 61 results in energization of second actuation means 29 (this is achieved by the passage of electrical current through contact member 28', a normally-closed contact when first actuation means 27 is unenergized as in the present situation). Because second actuation means 29 is energized, contact member 29' (a normally-opened contact when actuation means 29 is unenergized) now becomes closed. Similarly, normally-closed contact 30 is opened and with normally-opened contact 29' now closed, a path is provided for electrical current to third actuation means 31 thus energizing this means. Energization of means 31 in turn results in the closing of normally-opened contact 31'. Accordingly, normally-opened contact 29'' is now closed and normally-closed contact 30' now opened to provide a path of electrical current to the "raise" terminal on potentiometer drive means 39. Means 39 now mechanically alters potentiometer 41 to adjust the voltage differential to valving control means 43 which results in adjustment to the electro-mechanical valve on the apparatus. Thus, the boost pressure is raised prior to the next sequence by molding machine 11. The added result of the afore-mentioned sequence of events is that a path of electrical current is now provided to an indicating means 71 to indicate that this process is being achieved.

Should the operator determine that the boost pressure from the trial run is above the desired level, he depresses switch 63 thus energizing third actuation means 31. This in turn results in closing of normally-open contact 31'. Because normally-closed contact 30' remains closed as the result of second actuation means 29 being unenergized (switch 61 is now open) and because normally-open contact 29'' is open, a path of electrical current to the "lower" terminal on drive means 39 is provided. Similarly to the previously described procedure for raising the boost pressure, valving control means 43 now actuates the electro-mechanical valve on apparatus 11 to lower the boost pressure.

Additionally, an added result is that a path for electrical current to a second indicating means 73 is provided to indicate that the boost pressure is being lowered.

When the operator is satisfied that the desired boost pressure level is attained, he simply actuates the manual switching means 49 to place interface 15 in the control mode. Accordingly, the continuous output signal from computer 13 through lead 55 provides a means for continuously energizing first actuation means 27. This in turn results in the normally-closed contact 28' now being opened thus prohibiting any further manual manipulation utilizing switches 61 and 63. When the mold closes and power source 37 on the mold machine signals interrupt means 33, a resulting response signal is supplied computer 13. It is to be remembered that interrupt means 33 also is receiving a continuous signal through first actuation means 27. It is only when both signals are received by interrupt means 33 that a signal is supplied computer 13. As illustrated in the lower left hand portion of FIG. 2, contact 27' of first actuation means 27 and contact 33' of interrupt means 33 are electrically joined in series relationship. Thus with both contacts now being closed, a signal is provided. After the afore-mentioned clamp pressure reaches the desired point, the injection molding machine automatically starts the ram forward, a typical procedure in most injection molding machines. As previously described, this motion results in actuation of interrupt means 35. Actuation of means 35 results in the closing of normally-open contact 35'. Similar to the above operation of interrupt means 33, contact 35' and contact 27'' are in series relationship. Thus with both closed, computer 13 receives a signal from means 35 to in turn start its comparison with the signal provided by sensing means 17. If the comparison between the established reference signal (or set point) and the signal from sensing means 17 compare unfavorably, e.g. the pressure is too low, interface means 15 provides a means whereby apparatus 11 now is automatically adjusted to compensate for this discrepancy. For example, if the level is too low, computer 13 provides a secondary output signal along interconnecting lead 59 to provide a means whereby the boost pressure is raised in the molding machine. More specifically, second actuation means 29 is now energized as is third actuation means 31 (normally-open contact 29' is closed). Accordingly, a direct path for current flow is provided to the raise terminal on potentiometer drive means 39 (normally-open contact 29'' is closed, normally-closed contact 30' is opened, and normally-open contact 31' is closed). If the boost pressure is too high, the computer provides a secondary output signal along lead 57 to provide a means whereby the molding machine is actuated to lower the pressure. More particularly, third actuation means is energized with normally-open contact 31' now closing. Accordingly, a path for current flow to the lower terminal on means 39 is provided. It is to be noted that during this sequence, second actuation means 29 is unenergized.

If the signals compare within an established range, no secondary output signal is generated along leads 57 or 59 while the previously described continuous output signal on lead 55 is maintained. Thus, no adjustment to apparatus 11 occurs.

An additional feature as illustrated in FIGS. 1 and 2 is an alarm system whereby if the described signal comparison indicates that the boost pressure is either above or below the desired level by too great an amount, an indication of such a condition is provided. This is achieved in FIG. 2 by the computer's failure to provide a signal along interconnecting lead 55, resulting in de-energization of first actuation means 27. With first actuation means 27 unenergized, normally-open contacts 27' and 27'' are opened thus removing interrupt means 33 and 35 from the system. Similarly, normally-closed contact 28' (which had previously been opened is closed). Additionally, an alarm indicator 75 provides the required visual indication.

Interface means 15 as described and illustrated thus provides an automatic means for controlling a process variable within apparatus 11. It further provides an indication when the ranges above and below the desired level have been exceeded. While it does not provide a means whereby automatic shutoff to apparatus 11 is achieved, minor modifications to interface 15 could be provided to achieve said purpose. With the system as described and illustrated, apparatus 11 will continue to automatically operate and continue its normal sequence of operation despite an indication that the above limits have been exceeded. Thus an operator may turn off the apparatus and return interface means 15 to the setup mode and make the necessary corrective measures. As has been stated however interface 15 could easily be adapted for providing a signal to automatically shut off apparatus 11 if desired.

An additional feature of system 10 is illustrated in FIG. 1 in which a readout means 77 is provided to operate in conjunction with computer 13 to provide an operator with a continuous readout of each sequence of operation of apparatus 11. Readout 77 provides a summation of the clamp times, injection, boost pressure ranges, and the settings of the potentiometer 41. It is to be understood that minor modifications could be made to system 10 to provide readout means 77 with summaries of other process variables as experienced by apparatus 11.

Thus a system has been provided whereby an injection molding machine or similar apparatus which is sequentially actuated is automatically controlled to maintain a process variable within specified limits. As can be appreciated from the above description and illustration, it can be seen that other process variables of a sequentially actuated apparatus could also be maintained.

While there has been shown and described what are at present considered the preferred embodiments of the invention, it will be obvious to those skilled in the art that various changes and modifications may be made therein without departing from the scope of the invention as defined by the appended claims.

What is claimed is:

1. Interface means for interconnecting a sequentially actuated apparatus and a computer to automatically maintain at a desired level a process variable of said apparatus wherein said computer is adapted for receiving a response signal from said apparatus during each sequence of operation, said response signal indicative of the level of said process variable during each of said sequences of operation, said computer further adapted for comparing said response signal to a reference signal representative of said desired level for said process variable and providing a first output signal of continuous nature and at least one of two secondary output signals, a first of said secondary output signals indicative that said level of said process variable is less than said desired level, a second of said secondary output signals indicative that said level of said process variable is greater than said desired level, said interface means comprising:

first actuation means operatively connected to said computer and said apparatus for receiving said first continuous output signal and actuating said computer to receive said response signal from said apparatus;

second actuation means operatively connected to said computer, said first actuation means, and said apparatus for receiving said first secondary output signal and actuating said apparatus prior to the next sequence of operation of said apparatus to increase said level of said process variable to achieve said desired level; and third actuation means operatively connected to said computer, said first actuation means, and said apparatus for receiving said second secondary output signal and actuating said apparatus prior to the next sequence of operation of said apparatus to decrease said level of said process variable to achieve said desired level.

2. The interface means according to claim 1 wherein said sequentially actuated apparatus is a plastic injection molding machine.

3. The interface means according to claim 2 wherein said process variable is boost pressure.

4. The interface means according to claim 1 wherein said first actuation means is electrically connected to said computer and said apparatus.

5. The interface means according to claim 1 wherein said second actuation means is electrically connected to said computer and said first actuation means.

6. The interface means according to claim 1 wherein said second actuation means is electromechanically connected to said apparatus.

7. The interface means according to claim 1 wherein said third actuation means is electrically connected to said computer and said first actuation means.

8. The interface means according to claim 1 wherein said third actuation means is electromechanically connected to said apparatus.

9. A system for automatically maintaining at a desired level a process variable of a sequentially actuated apparatus wherein said apparatus is adapted for providing a response signal during each sequence of operation indicative of the level of said process variable during said sequence, said system comprising:

computer means adapted for receiving said response signal from said apparatus and for comparing said response signal to a reference signal representative of said desired level for said process variable, said computer means further adapted for providing a first output signal of continuous nature and at least one of two secondary output signals, a first of said secondary output signals indicative that said level of said process variable is less than said desired level, a second of said secondary output signals indicative that said level of said process variable is greater than said desired level; and interface means for interconnecting said sequentially actuated apparatus and said computer means, said interface means comprising first actuation means operatively connected to said computer means and said apparatus for receiving said first continuous output signal from said computer means and actuating said computer to receive said response signal from said apparatus, second actuation means operatively connected to said computer means, said first actuation means, and said apparatus for receiving said first secondary output signal from said computer means and actuating said apparatus prior to the next sequence of operation of said apparatus to increase the level of said process variable to achieve said desired level, and third actuation means operatively connected to said computer means, said first actuation means, and said apparatus for receiving said second secondary output signal and actuating said apparatus prior to the next sequence of operation of said apparatus to decrease the level of said process variable to achieve said desired level.

10. The system according to claim 9 wherein said sequentially actuated apparatus is a plastic injection molding machine.

11. The system according to claim 10 wherein said process variable is boost pressure.

12. The system according to claim 9 wherein said first actuation means is electrically connected to said computer and said apparatus.

13. The system according to claim 9 wherein said second actuation means is electrically connected to said computer and said first actuation means.

14. The system according to claim 9 wherein said second actuation means is electromechanically connected to said apparatus.

15. The system according to claim 9 wherein said third actuation means is electrically connected to said computer and said first actuation means.

16. The system according to claim 9 wherein said third actuation means is electromechanically connected to said apparatus.

* * * * *